3,528,737
LIGHT DIFFUSING RING FOR DIRECT EXPOSURE OF PHOTOSENSITIVE MATERIAL
James R. Denner, Shepton Mallet, Somerset, England, assignor to W. H. Howson Limited, Seacroft, Leeds, England, a company of England
Original application Mar. 7, 1967, Ser. No. 621,264. Divided and this application Jan. 2, 1969, Ser. No. 788,390
Claims priority, application Great Britain, Mar. 9, 1966, 10,327/66
Int. Cl. G03b 27/64
U.S. Cl. 355—67                3 Claims

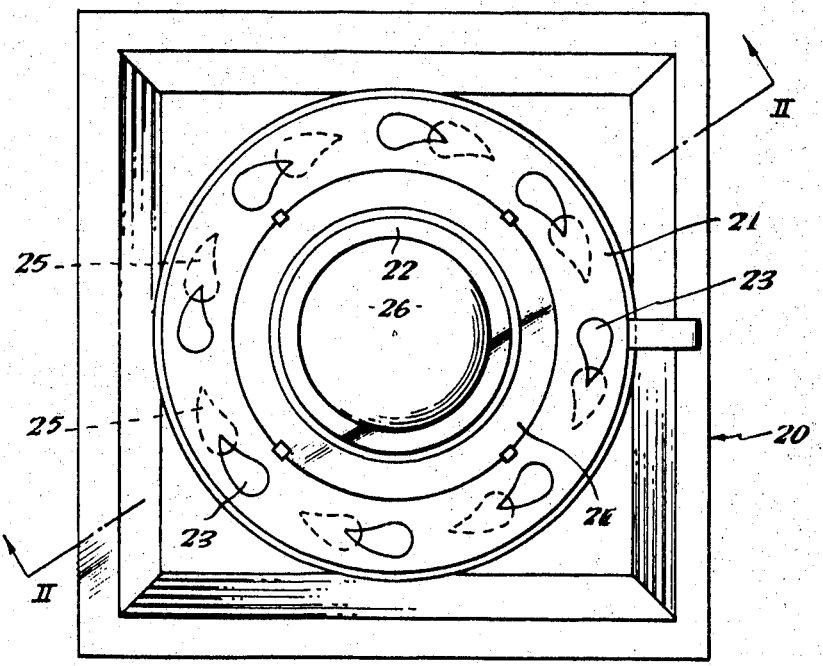
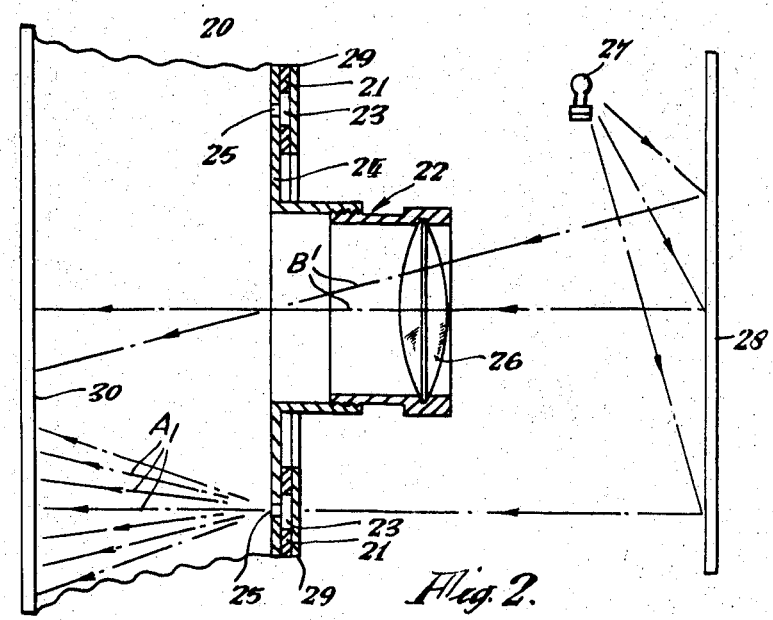

ABSTRACT OF THE DISCLOSURE

A camera has means for permitting the simultaneous giving of flash and main exposures from a single light source (namely, the object being photographed). Part of the light from the object passes through the leans to be focussed in the usual way onto photographic material in the camera; part passes through a translucent ring around the lens, into the camera, and is diffused over the photographic material. Means are provided for adjusting the ratio between the amount of focussed and of unfocussed light falling on the photographic material.

BACKGROUND OF THE INVENTION

This is a division of copending application Ser. No. 621,264 filed Mar. 7, 1967 for Means and Method of Applying Flash and Main Exposures, now U.S. Pat. No. 3,484,165, Dec. 16, 1969.

This invention relates to means for and methods of applying flash and main exposures in photographic processes.

A flash exposure is a non-image-forming exposure which is given to the whole area of a photographic material, particularly in colour separation and monochrome processes and particularly when printing through half-tone screens. The flash exposure in spite of its name is not necessarily of briefer duration than the main exposure and may be given for the same length of time as the main exposure. This latter is preferred because of the elimination of duplicate timing apparatus.

The main exposure is that exposure which gives a focussed image on the photographic material being exposed. The amount of light given during a main exposure is determined by the amount of light falling on the highlight parts of the image being presented and the amount of light given during a flash exposure is determined by the amount of light falling on the shadow parts of the image, the ratio between the two exposures being given to preserve a desired balance in the finished photographic material.

These two exposures are given both in cameras during the preparation of a plate and in enlargers during the exposure of a record.

Using two different sources for the two types of exposure brings many difficulties if really accurate work is required. Not least of these is the need for providing and adjusting two sets of lighting equipment, and timing the exposures if they are not to be applied concurrently.

In a camera, use of two sources necessarily involves two operations, one the exposure to the image, the other the exposure (either through the lens or by opening the camera) to flash-exposure light. But the more serious difficulty occurs in high-accuracy colour separation work. Hardly ever will two light sources be of exactly the same colour-temperature. The response curve of photo-electric cells to the two sources will therefore be different. Meter readings derived from such cells and purporting to give a measure of light value will therefore not give truly comparative values when different filters are interposed or when any change is made in the positioning of the enlarger head relative to the cells. The stopping effect of the lens or of the filter is different on light deriving from different colour-temperature sources, and if the response of the cells is also different, as it is, there is no way of determining and correcting the error introduced and balance as between highlight and shadow in the different records is likely to be faulty by a small but significant amount.

SUMMARY OF THE INVENTION

The object of the invention is to provide a camera wherein the flash and main exposures can be applied from a single light source. Separate control and adjustment and timing of two light sources can be thus avoided and the colour-temperature of the two exposures is identical.

The light source is that object which is being photographed, from which light enters the camera.

I provide a camera for the application of flash and main exposures to photographic material from a single light source, the camera having a lens for forming an image on the material with light derived from that source, diffusion means for diffusing into the area of the image light from the same source, characterised in that the diffusion means consist of a ring (which may be interrupted) of light-diffusing material surrounding the lens of the camera, the ring passing light into the camera and onto the film or plate from the object being photographed without any focussing effect. The amount of light so passed may be adjustable, so that flash and main exposures may be adjusted independently to appropriate levels.

One embodiment of the invention is illustrated in the accompanying drawings wherein:

FIG. 1 is a face view of a camera, and
FIG. 2 is a section on the line V—V, FIG. 1.

A camera 20 has a disc 21 rotatable about the lens mounting 22 of the camera and has a plurality of generally tangentially disposed pear-shaped apertures 23 disposed in it, the ring by rotational movements relative to the front face 24 of the camera (which front face supports the lens mounting), variably controlling the amount of light passing through registering apertures 25 in the front face of the camera. The pear-shaped apertures 23 are covered by a sheet of diffusing material 29, e.g. diffusing Perspex or glass, and light A′ passing through these apertures by-passes the lens 26 (although deriving from the same light source 27 illuminating the object 28, of which the camera is forming a focussed image by focussing light beams B′ through its lens) and give non-focussed illumination over the whole of the image-receiving area of the photographic material 30 inside the camera. Thus this one source gives both flash and main exposure in the camera. The control and determination of the ratio between the amount of light received through the lens and through the diffusion means is particularly valuably carried out by the method and means disclosed in my copending U.S. application No. 629,055 filed on Mar. 30, 1967 now abandoned.

If the camera is used for colour separation processes, a filter is mounted in front of the camera, to filter all light received by the lens and by the diffusion means.

I claim:
1. A camera for the application of flash and main exposures to photographic materials from a single light source, the camera having a lens for forming an image on the material with light derived from that source and diffusion means for diffusing into the area of the image light from the same source, the diffusion means including a ring of light-diffusing material surrounding the axis of the lens of the camera, the ring passing light into the camera and onto the photographic material without focussing effect.

2. A camera according to claim 1 wherein an adjustable shutter is provided to adjust the amount of light passing through the ring.

3. A camera according to claim 2 wherein the shutter consists of an array of pairs of apertures, one aperture of each pair on a rotatable ring and the other of each pair on the body of the camera, whereby rotation of the ring opens and closes the shutter formed by the pairs of apertures.

References Cited

UNITED STATES PATENTS 2,749,820   6/1956   Garutso _____ 95—18

NORTON ANSHER, Primary Examiner

D. J. CLEMENT, Assistant Examiner

U.S. Cl. X.R.

355—18, 70, 71